Nov. 20, 1951     W. J. S. JOHNSON     2,575,917

SWIVEL COUPLING

Filed July 1, 1949

INVENTOR.
WALLACE J. S. JOHNSON
BY

Mellin + Hanscom
ATTORNEYS

Patented Nov. 20, 1951

2,575,917

UNITED STATES PATENT OFFICE 2,575,917

SWIVEL COUPLING

Wallace J. S. Johnson, Berkeley, Calif., assignor to Up-Right, Inc., Berkeley, Calif., a corporation of California Application July 1, 1949, Serial No. 102,541

9 Claims. (Cl. 287—14)

This invention relates to a swivel coupling for coupling together tubular members of a scaffolding or the like.

It is an object of the present invention to provide a swivel coupling for coupling together tubular members of a scaffolding or the like, which is simple in design and construction, which is inexpensive to fabricate and which provides an easily operable and a dependable coupling.

It is a particular object of the invention to provide coupling means of the swivel variety for coupling together tubular members of a scaffolding, such coupling means being formed from sheet metal by simple operations such as cutting, twisting and bending the metal.

These and other objects of the invention will be apparent from the ensuing description and the appended claims.

The invention is exemplified in the following description and illustrated by way of example in the accompanying drawings, in which.

Figure 1:
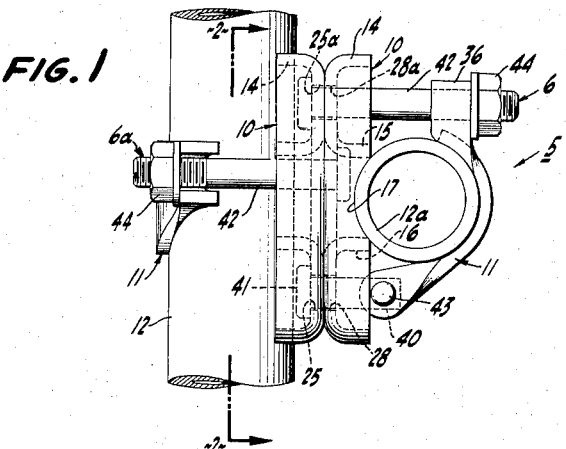
Fig. 1 is a view in side elevation of the coupling device of the invention, showing it as coupling two tubular scaffolding members at right angles.

Referring now to the drawings and more particularly to Fig. 1, the coupling member is generally designated as 5 and it comprises a pair of identical coupling members 6 and 6a arranged in back-to-back relationship. Each of the coupling members 6 and 6a comprises a swivel member or plate 10 and a hinged clamping cap 11. Tubular scaffolding members 12 and 12a are shown as being clamped in place at right angles to one another.

Figure 2:
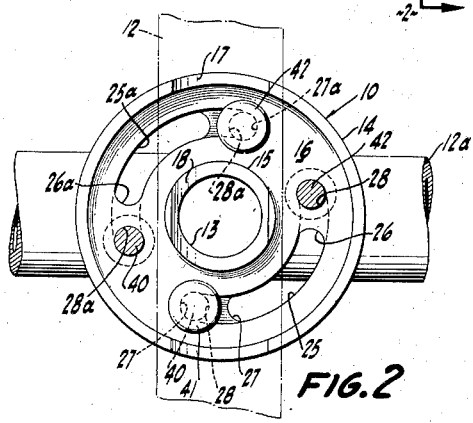
Fig. 2 is a section taken along the line 2—2 of Fig. 1.
Figure 3:
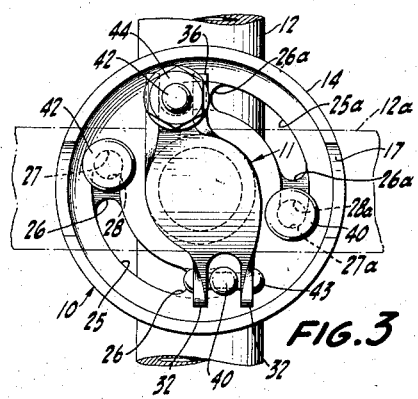
Fig. 3 is a view in end elevation as seen from the right of Fig. 1.

Referring now more particularly to Fig. 2, the swivel plate 10, as illustrated, is circular, it is punched to provide a central opening 13 and it is cupped to provide an outer rim 14 and an inner rim 15 spaced from the outer rim by an annular recess 16. The outer rim 14 is recessed at 17 and the inner rim is recessed at 18 and, as illustrated, the several recesses 17 and 18 are bisected by the same diameter. The swivel plate 10 is also formed with a slot 25 terminating at 26 and 27 and with a hole 28 spaced somewhat from the end 26 of the slot 25. The swivel member or plate is also formed with an identical slot 25a diametrically opposite the slot 25, which similarly terminates at 26a and 27a, and it is also formed with a hole 28a diametrically opposite the hole 28. It will be apparent that the diameter bisecting the recesses 17 and 18 is disposed at an angle to the diameter bisecting the slots 25 and 25a and to the diameter bisecting the holes 28 and 28a.

The opposite swivel plate 10 is formed identically to the swivel member or plate just described and which is shown in front elevation in Fig. 2.

Figure 5:
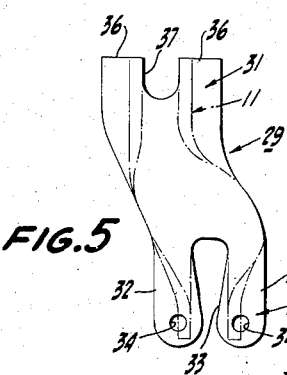
Fig. 5 is a plan view of the blank from which the clamping caps are formed.

Referring now more particularly to Fig. 5, the clamping cap 11 is formed from blank 29 of sheet metal, preferably an alloy of aluminum having a modulus of elasticity substantially less than that of steel. The blank 29 is formed with a hinge end 30 and a clamping end 31. The hinge end 30 is formed with ears or lugs 32 spaced apart by V-shaped recess 33, and a hole 34 is formed at the outer end of each ear 32. The clamping end 31 is similarly formed with ears 36 spaced apart by U-shaped recess 37. A clamping member 11 is formed from the blank 29 by twisting the ears 32 and 36 through 90°, from the positions shown in full lines to the positions shown in broken lines in Fig. 5.

In assembling the several elements of the coupling device, a pair of the swivel plates 10 and a pair of the clamping caps 11 are provided. The swivel plates 10 are arranged in back-to-back relationship and a relatively short hinge bolt 40 having a head 41 is passed first through slot 25 of the left-hand swivel member (as viewed in Fig. 1) and then through hole 28 of the right-hand swivel plate. A considerably longer clamping bolt 42 is passed first through slot 25a of the left-hand swivel plate and then through hole 28a of the right-hand swivel plate. The right-hand clamping cap 11 is pinned to the outer end of the hinge bolt 40 by means of a hinge pin 43 and a nut 44 is threaded onto the outer end of the clamping bolt 42.

It will be apparent that a similar hinge bolt 40 will be passed through slot 25 in the right-hand swivel plate and hole 28 in the left-hand swivel plate, and that a similar clamping bolt 42 will be passed through the slot 25a of the right-hand swivel plate and then through hole 28a in the left-hand swivel plate. The mounting of the left-hand clamping cap will be readily apparent.

Figure 4:
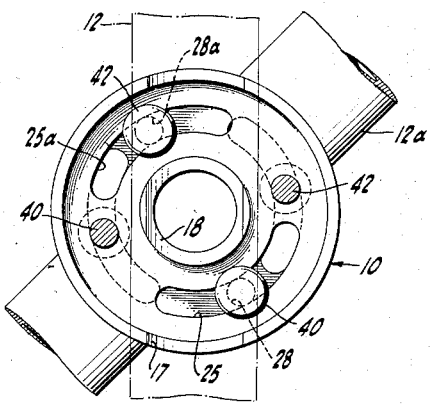
Fig. 4 is a view similar to that of Fig. 2 but showing one of the coupling members and one of the tubular scaffolding members rotated through an angle of 45° from the position shown in Fig. 2.

It will be apparent that either of the swivel plates 10 can be rotated independently of the other swivel plate through an angle sufficient to couple tubular scaffold members 12 and 12a in any desired angular relationship. Thus, if it is desired to couple the tubes at a 45° angle, one of the swivel plates 10 will be rotated until the relative position of the plates are as shown in Fig. 4. By rotating the rear swivel plate in a counter-clockwise direction as viewed in Fig. 4, through an angle of 45°, the tubes 12 and 12a will be coupled in parallelism. By rotating the rear swivel plate to the relative position shown in Fig. 2, the tubes 12 and 12a will be coupled in right-angular relationship. Obviously, either or both of the swivel plates may be rotated, as is most convenient. The tubes 12 and 12a are easily clamped in selected angular positions by so adjusting the swivel plates 10 and by swinging the clamping caps 11 over the tubes, seating the clamping bolts 42 in recesses 37 and tightening the nuts 44.

It will thus be apparent that a coupling means is provided which is capable of swiveling so as to couple tubular scaffolding members at any desired angle relatively to one another. It is further apparent that the means so provided is simple from the standpoint of fabrication and operation. It is advantageously constructed of sheet metal, preferably an aluminum alloy. The only operations necessary are to cut out the appropriate blanks and, by means of conventional cutting, punching, stamping and bending operations, to form the swivel plates and clamping caps from the blanks. Besides being simple from the standpoint of fabrication and operation, the coupling means so provided is very dependable.

Among other and special advantages of the swivel coupling of the invention are the following: The two swivel plates are identical and the two clamping caps are also identical. The hinge bolts, clamping bolts, clamping nuts and hinge pins are standard items. Thus, only two specially fabricated parts are necessary. As explained, these are formed of sheet metal by standard metal forming operations, and wastage of material is minimized.

The two halves of the coupling are held in axial alignment by means of slots and bolts which are disposed 180° apart. Thus, no center pivot pin or rivet is required.

From these and other features of the coupling, a balanced clamping action is obtained. No interlocking of the swivel plates is necessary owing to the fact that the swivel plates themselves are clamping members, are in abutting relationship and are firmly clamped in adjusted angular position by means of the clamping caps and bolts. Full 90° adjustment is also possible.

The cupped swivel plates are each formed with four recesses which form a convenient seat or saddle for the coupled tubes and provide adequate bearing surface to insure secure clamping. Minimum distorting force is exerted on the coupled tubes.

Although the coupling device of the invention may be made of any suitable material, a metal such as well known alloys of aluminum is preferred, which has a modulus of elasticity substantially less than that of steel. Thus, suitable aluminum alloys have a modulus of elasticity, one third that of steel. Since the coupling device is designed for the purpose of flexing to conform to the contour of the coupled members, it will be apparent that a more flexible metal is desirable.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A coupling device comprising a pair of swivel members arranged in back-to-back relationship, connecting means extending therethrough to hold said members in axial alignment but to allow relative rotative movement, clamping means cooperating with the face of one of said swivel members, and clamping means cooperating with the face of the other of said swivel members and mounted on said connecting means so as to rotate with said other swivel member.

2. A coupling device comprising a pair of swivel plates each having a pair of arcuate slots formed therein arranged in overlapping relationship, the slots formed in the swivel plates being similar, a pair of connecting pins carried by each plate and passing through the slots in the opposite plate, and clamping means on each pair of connecting pins for cooperation with the face of the associated swivel plate.

3. A coupling device comprising a pair of sheet metal swivel plates and a pair of sheet metal clamping caps; each said swivel plate being formed with spaced inner and outer rims, said rims being recessed along a diameter to provide a seat for a tubular scaffolding member, and the annular space between said rims being formed with arcuate slots spaced 180° apart and with holes spaced 180° apart and disposed between the slots; said swivel plates being arranged in back-to-back relationship; and pin or bolt connections extending through the holes and slots in said swivel plates to hold the same in axial alignment but free to rotate relatively to each other; said clamping caps being hingedly mounted on said connections.

4. A coupling device comprising a pair of sheet metal swivel plates and a pair of sheet metal clamping caps having a modulus of elasticity substantially less than that of steel, each said swivel plate being formed with spaced inner and outer rims, said rims being recessed along a diameter to provide a seat for a tubular scaffolding member, and the annular space between said rims being formed with arcuate slots spaced 180° apart and with holes spaced 180° apart and disposed between the slots; said swivel plates being arranged in back-to-back relationship; and pin or bolt connections extending through the holes and slots in said swivel plates to hold the same in axial alignment but free to rotate relatively to each other; said clamping caps being hingedly mounted on said connections.

5. A coupling device comprising a pair of sheet aluminum swivel plates and a pair of sheet aluminum clamping caps, each said swivel plate being formed with spaced inner and outer rims, said rims being recessed along a diameter to provide a seat for a tubular scaffolding member, and the annular space between said rims being formed with arcuate slots spaced 180° apart and with holes spaced 180° apart and disposed between the slots; said swivel plates being arranged in back-to-back relationship; and pin or bolt connections extending through the holes and slots in said swivel plates to hold the same in axial alignment but free to rotate relatively to each other; said clamping caps being hingedly mounted on said connections.

6. A coupling device comprising a pair of identically formed swivel plates each formed with a pair of arcuate slots disposed 180° apart and with a hole adjacent one end of each slot; bolt or pin connections cooperating with the slots and holes formed in said plates to connect the plates in back-to-back relationship and in axial alignment and allowing rotative movement of either plate independently of the other plate; and clamping means for each plate hingedly mounted on said connections for rotation with the plate.

7. A coupling device constructed of sheet metal, comprising a pair of swivel plates each having inner and outer rims formed with aligned recesses adapted to receive a tubular member, each said plate being also formed with a pair of diametrally spaced, arcuate slots and with holes disposed between the ends of the slots, a pair of clamping members and pin or bolt connections cooperating with said holes and slots to hold the swivel plates in axial alignment while allowing rotation of either independently of the other, each said clamping member being hingedly mounted at one end on said connections and being formed with means at the other end for engaging said connections to clamp a pipe in place.

8. A coupling device comprising a pair of circular swivel plates each formed of sheet metal and with inner and outer rims and an annular recess therebetween, said annular recess being provided with diametrally spaced, arcuate slots and with diametrally spaced holes between the ends of the slots; a pair of clamping members also formed of sheet metal and having a bifurcated hinge end and a bifurcated clamping end each twisted through 90°; and bolt connections passing through and cooperating with said slots and holes to hold the swivel plates in axial alignment but allow rotative movement of either independently of the other, and also serving to mount the bifurcated hinge end of each clamping member and to engage and clamp the clamping end of each clamping member.

9. A flexible sheet metal coupling device comprising a pair of circular swivel plates each formed to provide an outer annular rim, an inner annular rim and recesses in said rims bisected by a diameter of the plate, the annular portion between said rims being formed with a pair of arcuate slots bisected by a diameter of the plate and a pair of holes also bisected by a diameter of the plate and disposed between said slots; a pair of clamping caps each having a perforated, bifurcated hinge end and a bifurcated clamping end; and pin and bolt connections extending through said holes and slots to mount said swivel plates back-to-back in axial alignment and to allow relative rotative movement thereof; each of said clamping caps being hingedly mounted at its hinge end on one of said pin connections and co-operating at its clamping end with one of said bolt connections to clamp a tubular member.

WALLACE J. S. JOHNSON.

REFERENCES CITED

The following references are of record in the file of this patent:

UNITED STATES PATENTS

| Number | Name | Date |
|---|---|---|
| 1,706,215 | Davidson | Mar. 19, 1929 |
| 1,787,167 | Purdy | Dec. 30, 1930 |
| 1,860,839 | Marshall | May 31, 1932 |
| 2,467,604 | Tinnerman et al. | Apr. 19, 1949 |

FOREIGN PATENTS

| Number | Country | Date |
|---|---|---|
| 68,450 | Sweden | Mar. 26, 1927 |
| 32,181 | Netherlands | Mar. 15, 1934 |